(12) United States Patent
Chou

(10) Patent No.: US 10,436,952 B2
(45) Date of Patent: Oct. 8, 2019

(54) LENS MODULE AND ELECTRONIC DEVICE

(71) Applicant: LARGAN PRECISION CO., LTD., Taichung (TW)

(72) Inventor: Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 16/364,437

(22) Filed: Mar. 26, 2019

(65) Prior Publication Data

US 2019/0219741 A1 Jul. 18, 2019

Related U.S. Application Data

(63) Continuation of application No. 15/704,232, filed on Sep. 14, 2017, now Pat. No. 10,288,776, which is a continuation of application No. 14/974,314, filed on Dec. 18, 2015, now Pat. No. 9,798,048.

(30) Foreign Application Priority Data

Nov. 20, 2015 (TW) .............................. 104218715 U

(51) Int. Cl.
| | |
|---|---|
| G02B 3/02 | (2006.01) |
| G02B 3/04 | (2006.01) |
| G02B 27/00 | (2006.01) |
| G02B 7/02 | (2006.01) |
| G02B 13/00 | (2006.01) |
| G02B 1/04 | (2006.01) |

(52) U.S. Cl.
CPC .............. *G02B 3/04* (2013.01); *G02B 1/041* (2013.01); *G02B 7/021* (2013.01); *G02B 7/022* (2013.01); *G02B 13/0045* (2013.01); *G02B 27/0018* (2013.01); *G02B 27/0025* (2013.01)

(58) Field of Classification Search
CPC ............................. G02B 3/04; G02B 13/0045
USPC ....................................................... 359/714
See application file for complete search history.

(56) References Cited

U.S. PATENT DOCUMENTS

| | | | |
|---|---|---|---|
| 3,562,513 A | 2/1971 | Jaffe | |
| 7,209,301 B2 | 4/2007 | Chao | |
| 8,908,282 B2 | 12/2014 | Yang et al. | |
| 2012/0218649 A1 | 8/2012 | Konishi et al. | |
| 2013/0148208 A1* | 6/2013 | Yang ...................... | G02B 7/022 359/642 |
| 2016/0011415 A1 | 1/2016 | Takada | |

* cited by examiner

*Primary Examiner* — James C. Jones
(74) *Attorney, Agent, or Firm* — McClure, Qualey & Rodack, LLP

(57) ABSTRACT

A plastic lens element includes an effective optical portion and a peripheral portion in order from an optical axis to an edge thereof. The peripheral portion includes a plurality of rib structures, wherein each of the rib structures has a strip shape in a radial direction of the optical axis, and the rib structures are arranged around the effective optical portion and indirectly connected to the effective optical portion.

7 Claims, 19 Drawing Sheets

LENS MODULE AND ELECTRONIC DEVICE

RELATED APPLICATIONS

The present application is a continuation of the application Ser. No. 15/704,232 filed on Sep. 14, 2017, which is a continuation of the application Ser. No. 14/974,314, filed on Dec. 18, 2015, U.S. Pat. No. 9,798,048 issued on Oct. 24, 2017, and claims priority to Taiwan application serial number 104218715, filed on Nov. 20, 2015, the entire contents of which are hereby incorporated herein by reference.

BACKGROUND

Technical Field

The present disclosure relates to a plastic lens element and a lens module. More particularly, the present disclosure relates to a plastic lens element and a lens module which are applicable to portable electronic devices.

Description of Related Art

Due to the popularity of personal electronic products and mobile communication products having camera functionalities, such as smart phones and tablet personal computers, the demand for compact lens modules has been increasing and the requirements for high resolution and image quality of present compact lens modules increase significantly.

A plastic lens element is generally used to effectively reduce the manufacturing cost of the lens module. A conventional plastic lens element is typically formed by an injection molding method and has a smooth and bright surface, which is featured with high reflectivity. Accordingly, when the non-imaging light is reflected from the surfaces of other optical elements of the lens module to the surface of the plastic lens element, the non-imaging light reflected from the surface of the plastic lens element cannot be effectively attenuated and would be incident on the surfaces of lens elements of the lens module.

Given the above, a surface property of the plastic lens element relates to the image quality of the lens module. How to reduce the non-imaging light reflected from the surface of the plastic lens element has become one of the important subjects, so that the image quality of the compact lens modules can be enhanced, and the requirements of high-end optical systems with camera functionalities can be satisfied.

SUMMARY

According to one aspect of the present disclosure, a plastic lens element includes an effective optical portion and a peripheral portion in order from an optical axis to an edge thereof. The peripheral portion includes a plurality of rib structures, wherein each of the rib structures has a strip shape in a radial direction of the optical axis, and the rib structures are arranged around the effective optical portion and indirectly connected to the effective optical portion.

According to another aspect of the present disclosure, a lens module includes an optical lens assembly. The optical lens assembly includes the plastic lens element according to the foregoing aspect.

According to another aspect of the present disclosure, an electronic device includes a lens module according to the foregoing aspect.

According to another aspect of the present disclosure, a plastic lens element includes an effective optical portion and a peripheral portion in order from an optical axis to an edge thereof. The peripheral portion includes a plurality of rib structures, wherein each of the rib structures has a strip shape in a radial direction of the optical axis, and the rib structures are arranged around the effective optical portion and indirectly connected to the effective optical portion. When a width of each of the rib structures in a circumferential direction of the plastic lens element is w, and the following condition is satisfied:

0.01 mm<w<0.05 mm.

According to another aspect of the present disclosure, a lens module includes an optical lens assembly. The optical lens assembly includes the plastic lens element according to the foregoing aspect.

According to another aspect of the present disclosure, an electronic device includes a lens module according to the foregoing aspect.

DETAILED DESCRIPTION

1st Embodiment

Figure 1A:
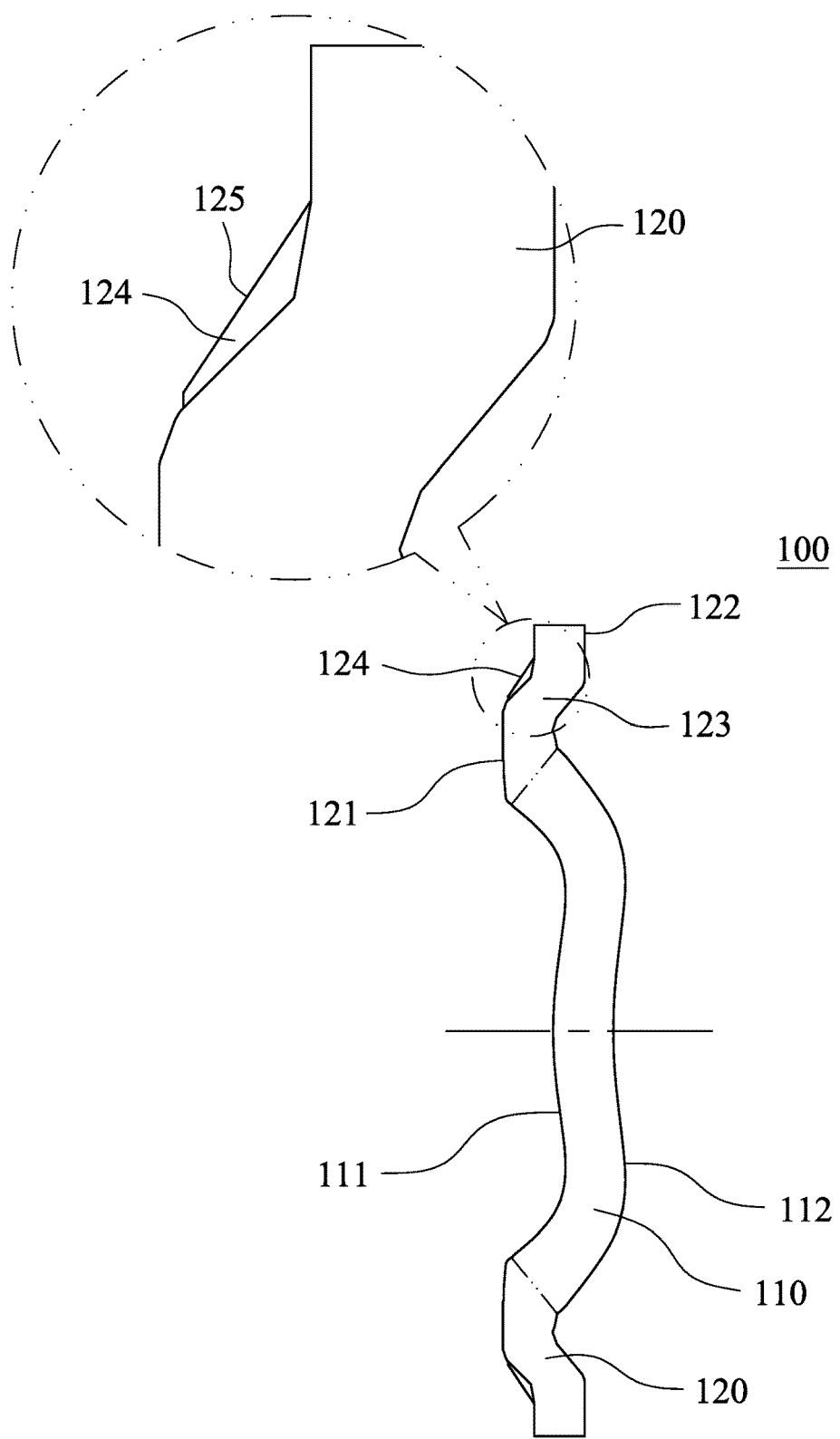
FIG. 1A is a schematic view of a plastic lens element according to the 1st embodiment of the present disclosure.
Figure 1B:
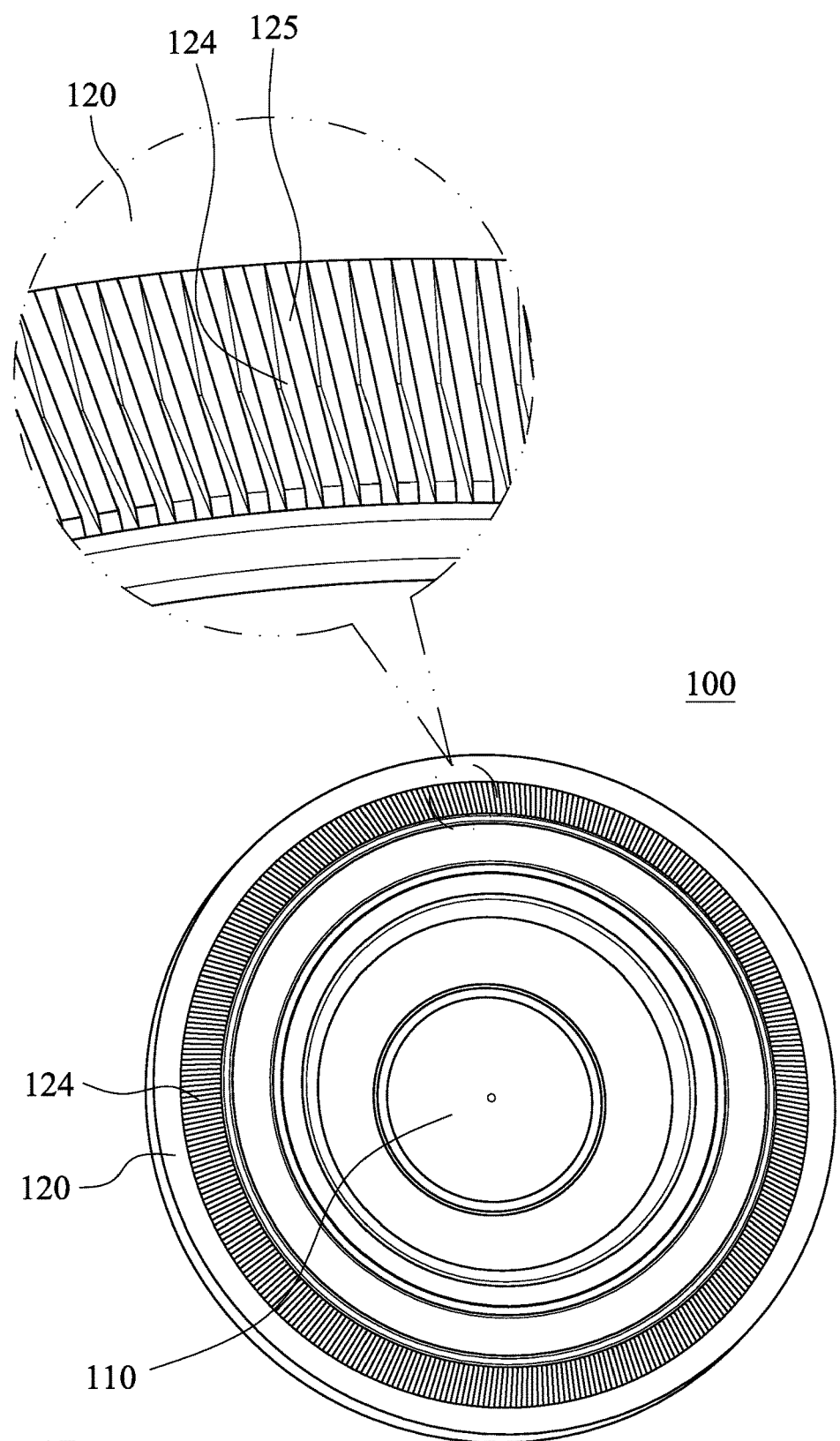
FIG. 1B shows a schematic view of the rib structures according to the 1st embodiment.
Figure 1C:
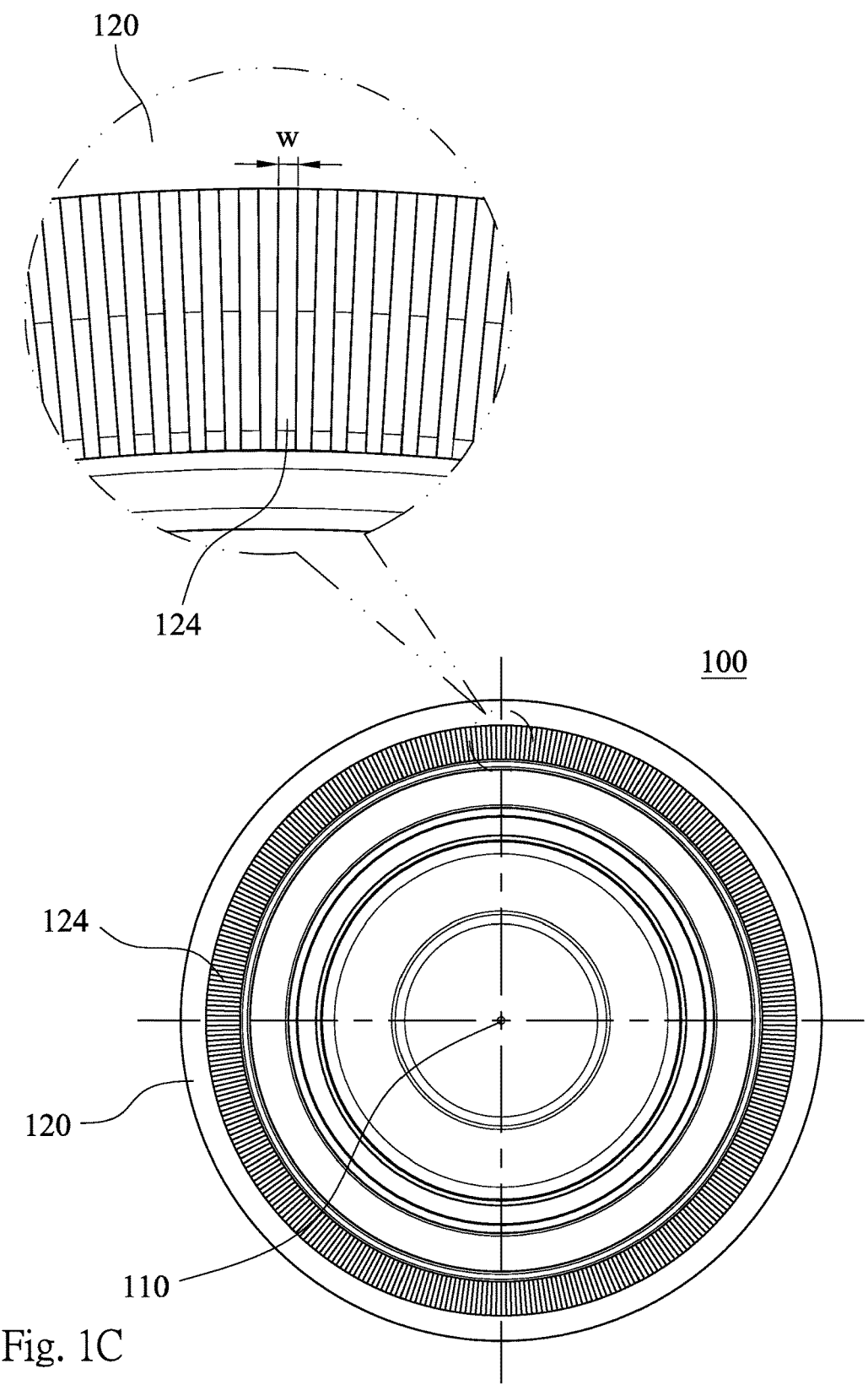
FIG. 1C shows a schematic view of the parameter w according to the 1st embodiment.

FIG. 1A is a schematic view of a plastic lens element 100 according to the 1st embodiment of the present disclosure, and FIG. 1B shows a schematic view of a plurality of rib structures 124 according to the 1st embodiment. In FIG. 1A and FIG. 1B, the plastic lens element 100 includes an effective optical portion 110 and a peripheral portion 120 in order from an optical axis to an edge of the plastic lens element 100.

The peripheral portion 120 includes the rib structures 124, wherein each of the rib structures 124 has a strip shape in a radial direction of the optical axis, and the rib structures 124 are arranged around the effective optical portion 110 and indirectly connected to the effective optical portion 110. In details, the peripheral portion 120 can further include a connection portion 123, wherein the rib structures 124 are connected to the effective optical portion 110 through the connection portion 123. That is, the rib structures 124 are indirectly connected to the effective optical portion 110. Therefore, it is favorable for effectively attenuating the non-imaging light reflected from the surface of the plastic lens element 100 so as to enhance the image quality of the lens module.

Figure 10:
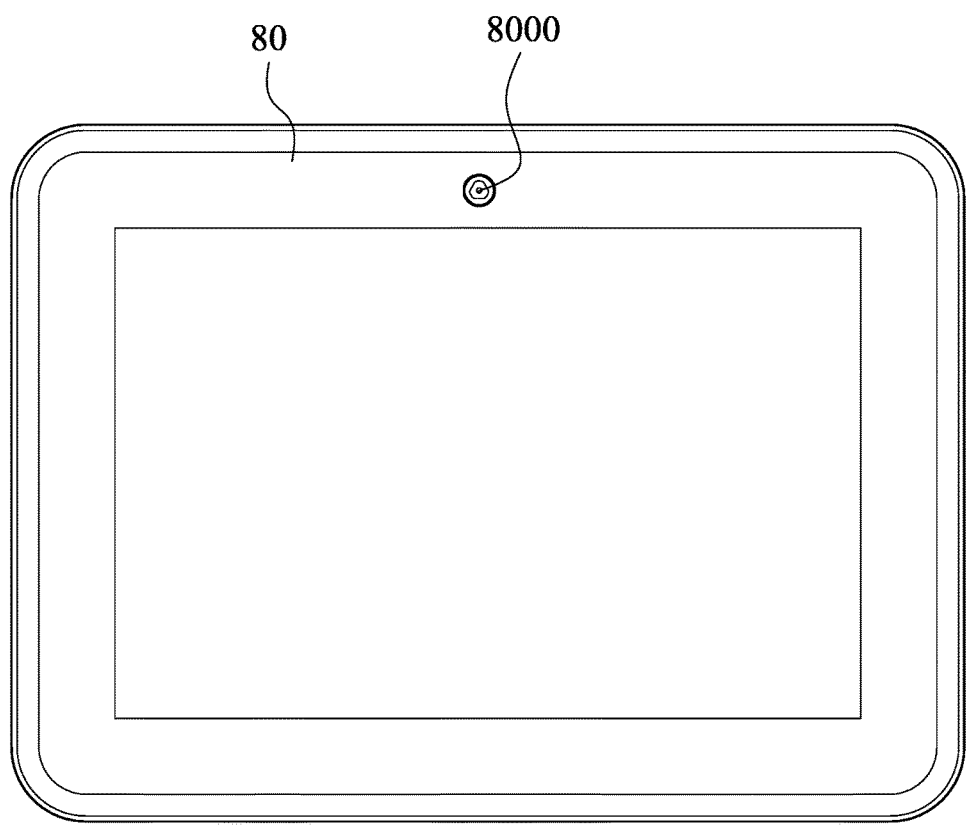
FIG. 10 shows an electronic device according to the 10th embodiment of the present disclosure.

Furthermore, FIG. 10 shows a schematic view of a parameter w according to the 1st embodiment. In FIG. 10, when a width of each of the rib structures 124 in a circumferential direction of the plastic lens element 100 is w, the following condition can be satisfied: 0.01 mm<w<0.05 mm. Therefore, it is favorable for increasing the roughness of the plastic lens element 100 so as to diverge the non-imaging light. In the 1st embodiment, the following condition is satisfied: w=0.02 mm.

According to the 1st embodiment of the present disclosure, the rib structures 124 and the plastic lens element 100 can be formed integrally. Therefore, it is favorable for maintaining the manufacturing convenience of the plastic lens element 100.

In the 1st embodiment, a number of the rib structures 124 can be greater than or equal to 60, and smaller than or equal to 400. Therefore, it is favorable for maintaining the denseness of the rib structures 124 so as to reflect hardly.

In FIG. 1A and FIG. 1B, each of the rib structures 124 can have an inclined surface 125 having an angle with the optical axis of the plastic lens element 100. The aforementioned angle is greater than 0 degrees and less than 90 degrees. In other words, the inclined surface 125 is neither parallel nor orthogonal to the optical axis of the plastic lens element 100. Therefore, it is favorable for reducing the possible paths of the surface reflection.

In FIG. 1A, at least one of two surfaces of the effective optical portion 110 can have a wavy shape. That is, the effective optical portion 110 includes an object-side surface 111 and an image-side surface 112, wherein the object-side surface 111 is a surface of the effective optical portion 110 facing an object (not shown), the image-side surface 112 is the other surface of the effective optical portion 110 facing an image surface (not shown), and at least one of the object-side surface 111 and the image-side surface 112 can have a wavy shape. Moreover, a surface of the effective optical portion 110 having a wavy shape means the surface including at least one concave shape in an off-axial region thereof while the surface is convex in a paraxial region thereof, or the surface including at least one convex shape in the off-axial region thereof while the surface is concave in a paraxial region thereof. Therefore, it is favorable for enhancing the resolution of the plastic lens element 100. In the 1st embodiment, both of two surfaces (the object-side surface 111 and the image-side surface 112) of the effective optical portion 110 have a wavy shape.

In FIG. 1A, the peripheral portion 120 can further include an object-side abutting surface 121, which is disposed on a surface of the peripheral portion 120 facing the object and orthogonal to the optical axis of the plastic lens element 100. The rib structures 124 of the plastic lens element 100 can be disposed on the surface of the peripheral portion 120 facing the object, and the rib structures 124 can be farther from the effective optical portion 110 than the object-side abutting surface 121. Therefore, it is favorable for increasing the divergence efficiency of the reflected light of the plastic lens element 100 so as to avoid the reflected light incident on the image surface of the lens module.

In FIG. 1A, the peripheral portion 120 can further include an image-side abutting surface 122, which is disposed on another surface of the peripheral portion 120 facing the image surface and orthogonal to the optical axis of the plastic lens element 100, wherein the image-side abutting surface 122 can be farther from the effective optical portion 110 than the object-side abutting surface 121. Therefore, it is favorable for the plastic lens element 100 applicable to the imaging apparatus with high pixels.

2nd Embodiment

Figure 2A:
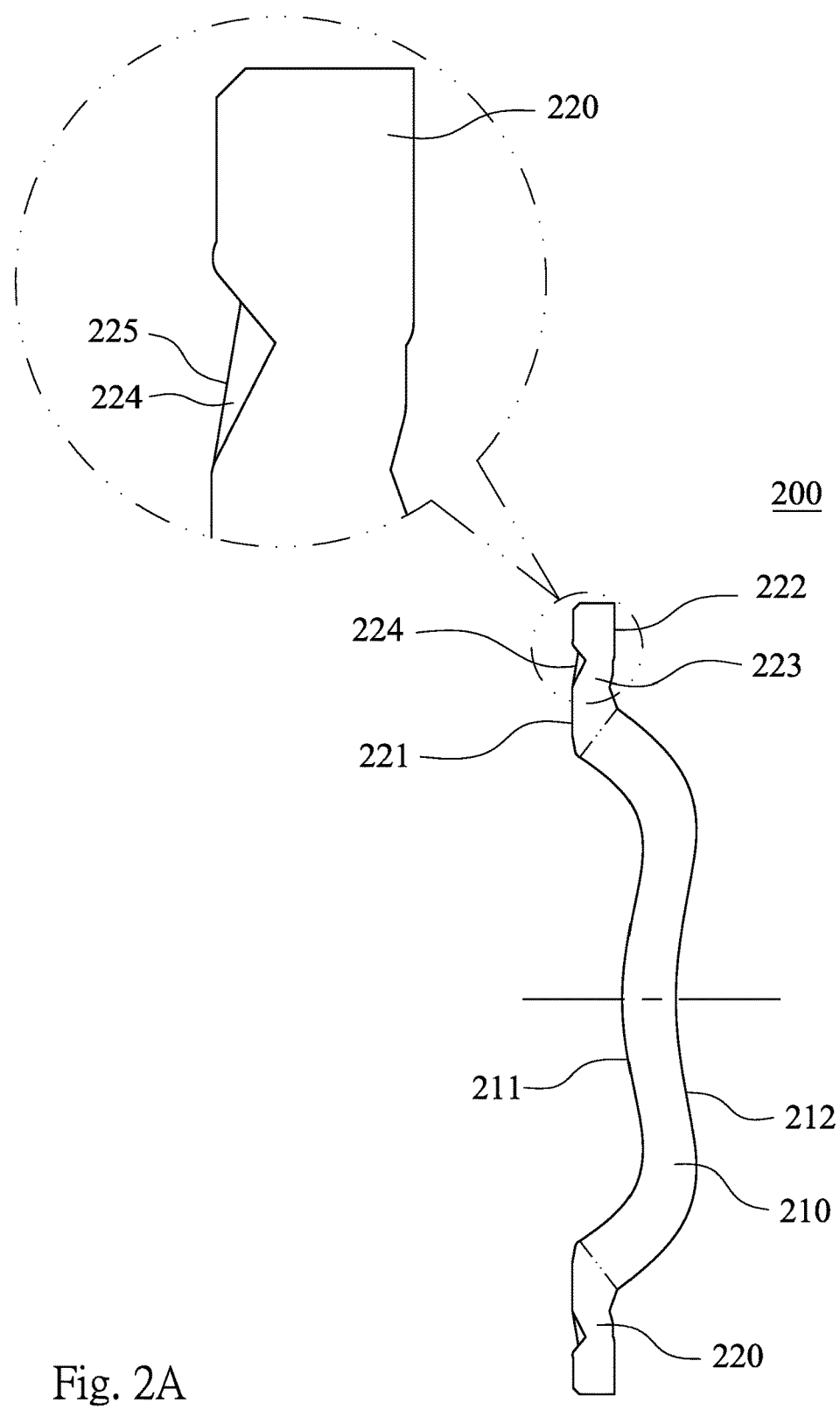
FIG. 2A is a schematic view of a plastic lens element according to the 2nd embodiment of the present disclosure.
Figure 2B:
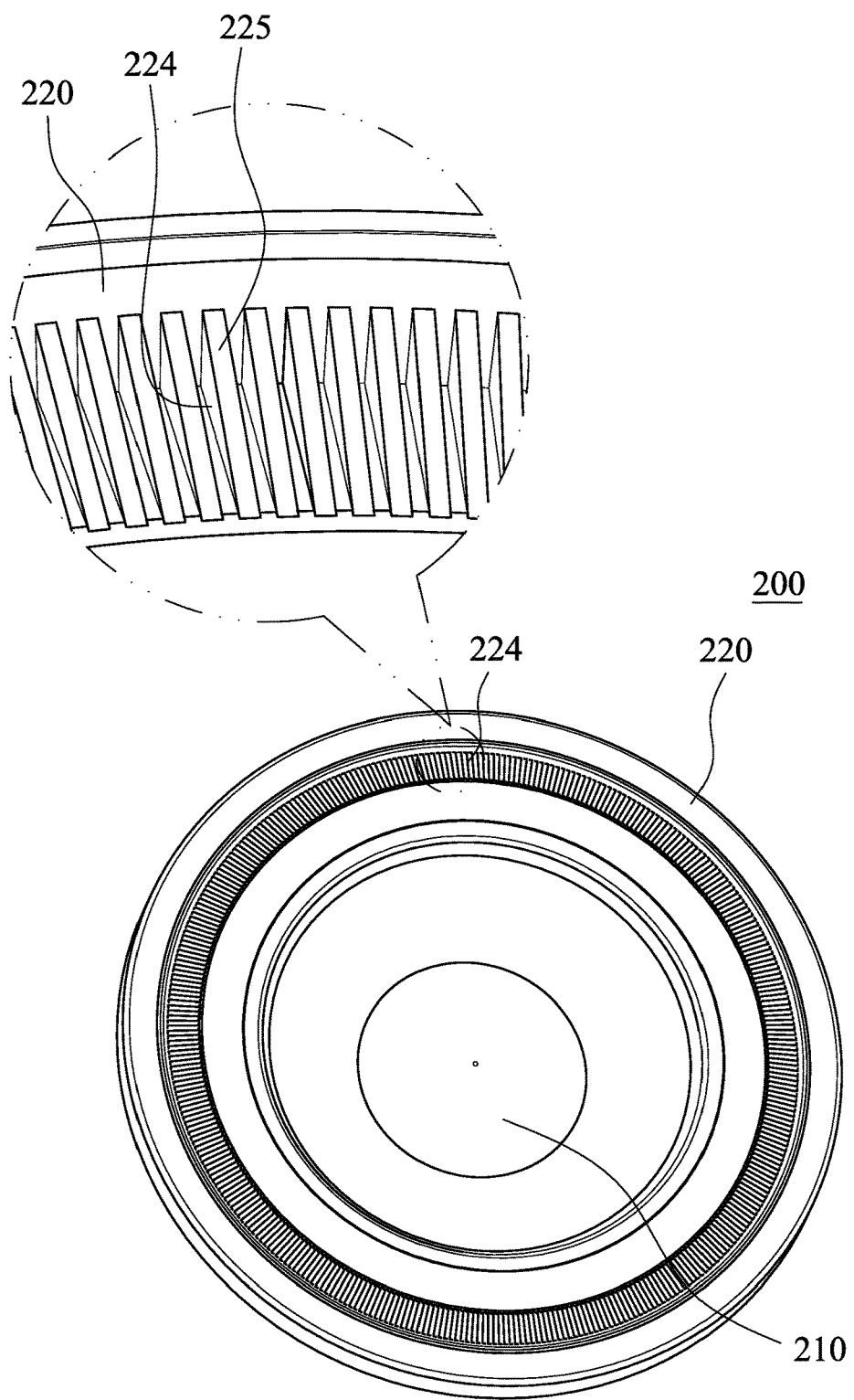
FIG. 2B shows a schematic view of the rib structures according to the 2nd embodiment.

FIG. 2A is a schematic view of a plastic lens element 200 according to the 2nd embodiment of the present disclosure, and FIG. 2B shows a schematic view of a plurality of rib structures 224 according to the 2nd embodiment. In FIG. 2A and FIG. 2B, the plastic lens element 200 includes an effective optical portion 210 and a peripheral portion 220 in order from an optical axis to an edge of the plastic lens element 200.

The peripheral portion 220 includes the rib structures 224, wherein each of the rib structures 224 has a strip shape in a radial direction of the optical axis, and the rib structures 224 are arranged around the effective optical portion 210 and indirectly connected to the effective optical portion 210. In details, the peripheral portion 220 further includes a connection portion 223, wherein the rib structures 224 are connected to the effective optical portion 210 through the connection portion 223.

Figure 2C:
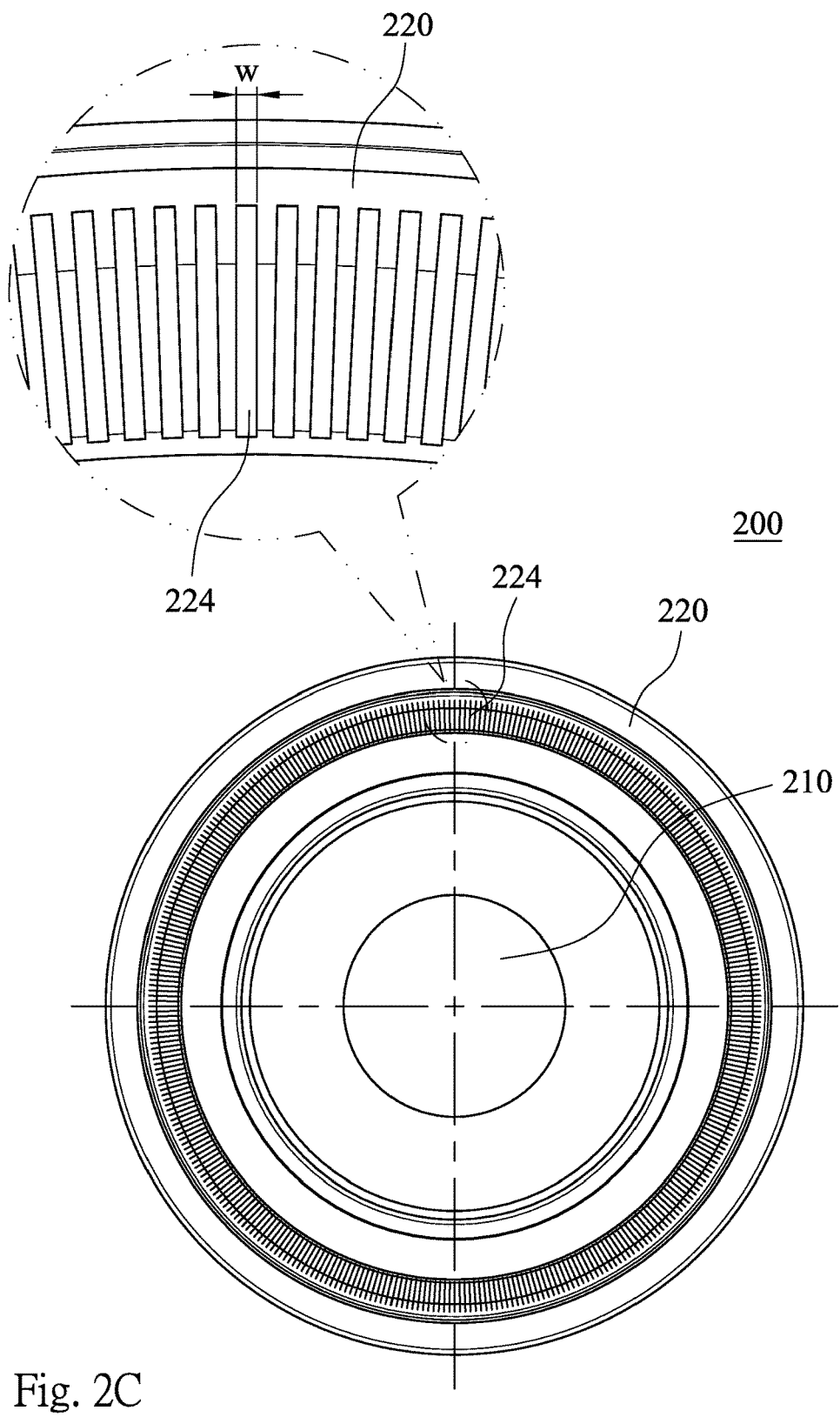
FIG. 2C shows a schematic view of the parameter w according to the 2nd embodiment.

FIG. 2C shows a schematic view of a parameter w according to the 2nd embodiment. In FIG. 2C, when a width of each of the rib structures 224 in a circumferential direction of the plastic lens element 200 is w, the following condition is satisfied: w=0.02 mm.

According to the 2nd embodiment of the present disclosure, the rib structures 224 and the plastic lens element 200 are formed integrally. A number of the rib structures 224 is greater than or equal to 60, and smaller than or equal to 400.

In FIG. 2A and FIG. 2B, each of the rib structures 224 has an inclined surface 225 having an angle with the optical axis of the plastic lens element 200. The aforementioned angle is greater than 0 degrees and less than 90 degrees. In other words, the inclined surface 225 is neither parallel nor orthogonal to the optical axis of the plastic lens element 200.

In FIG. 2A, the effective optical portion 210 includes an object-side surface 211 and an image-side surface 212, wherein the object-side surface 211 is a surface of the effective optical portion 210 facing an object (not shown), the image-side surface 212 is the other surface of the effective optical portion 210 facing an image surface (not shown), and both of two surfaces (the object-side surface 211 and the image-side surface 212) of the effective optical portion 210 have a wavy shape.

In FIG. 2A, the peripheral portion 220 further includes an object-side abutting surface 221, which is disposed on a surface of the peripheral portion 220 facing the object and orthogonal to the optical axis of the plastic lens element 200.

The rib structures 224 of the plastic lens element 200 is disposed on the surface of the peripheral portion 220 facing the object, and the rib structures 224 is farther from the effective optical portion 210 than the object-side abutting surface 221.

In FIG. 2A, the peripheral portion 220 further includes an image-side abutting surface 222, which is disposed on another surface of the peripheral portion 220 facing the image surface and orthogonal to the optical axis of the plastic lens element 200, wherein the image-side abutting surface 222 is farther from the effective optical portion 210 than the object-side abutting surface 221.

3rd Embodiment

Figure 3A:
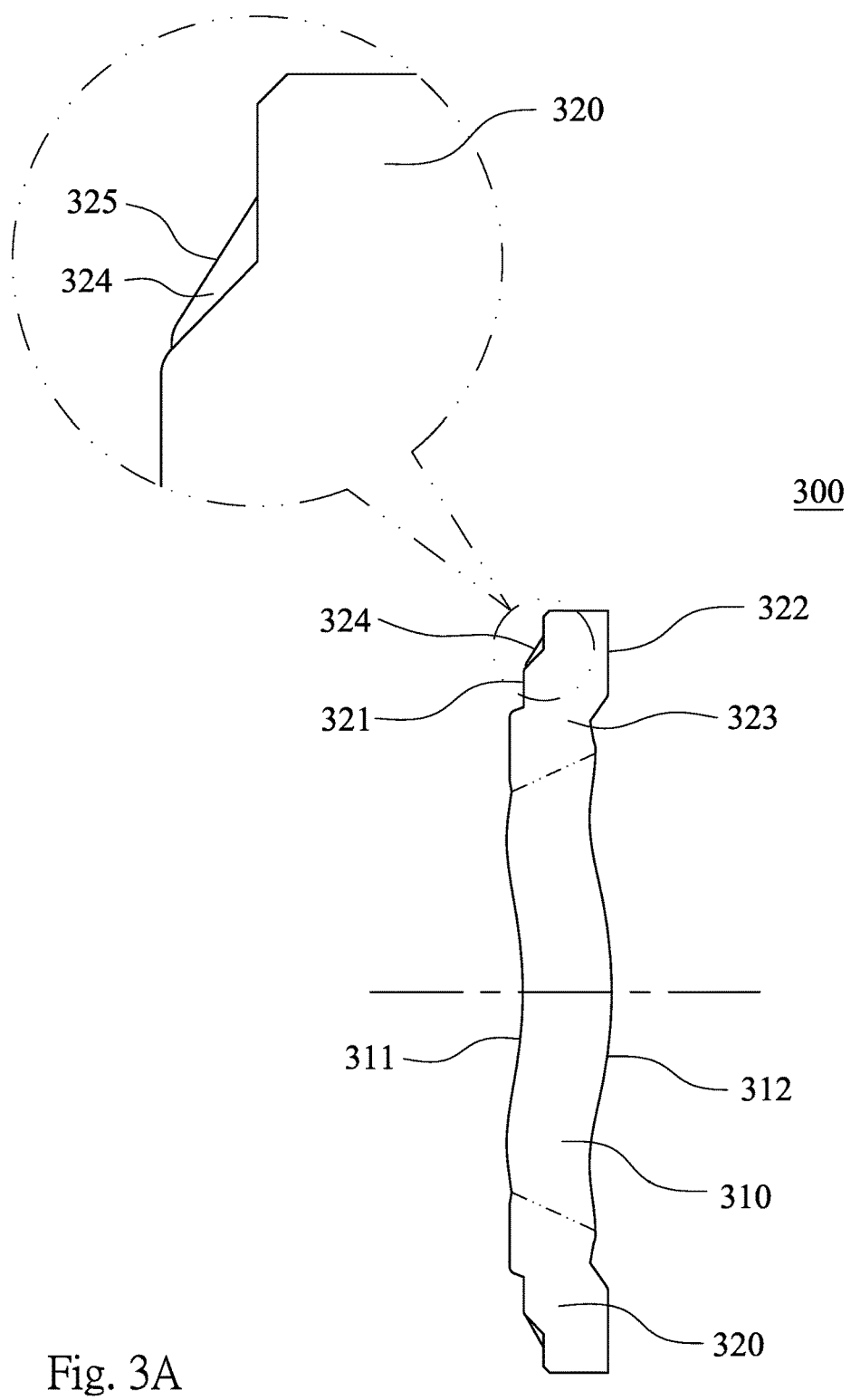
FIG. 3A is a schematic view of a plastic lens element according to the 3rd embodiment of the present disclosure.
Figure 3B:
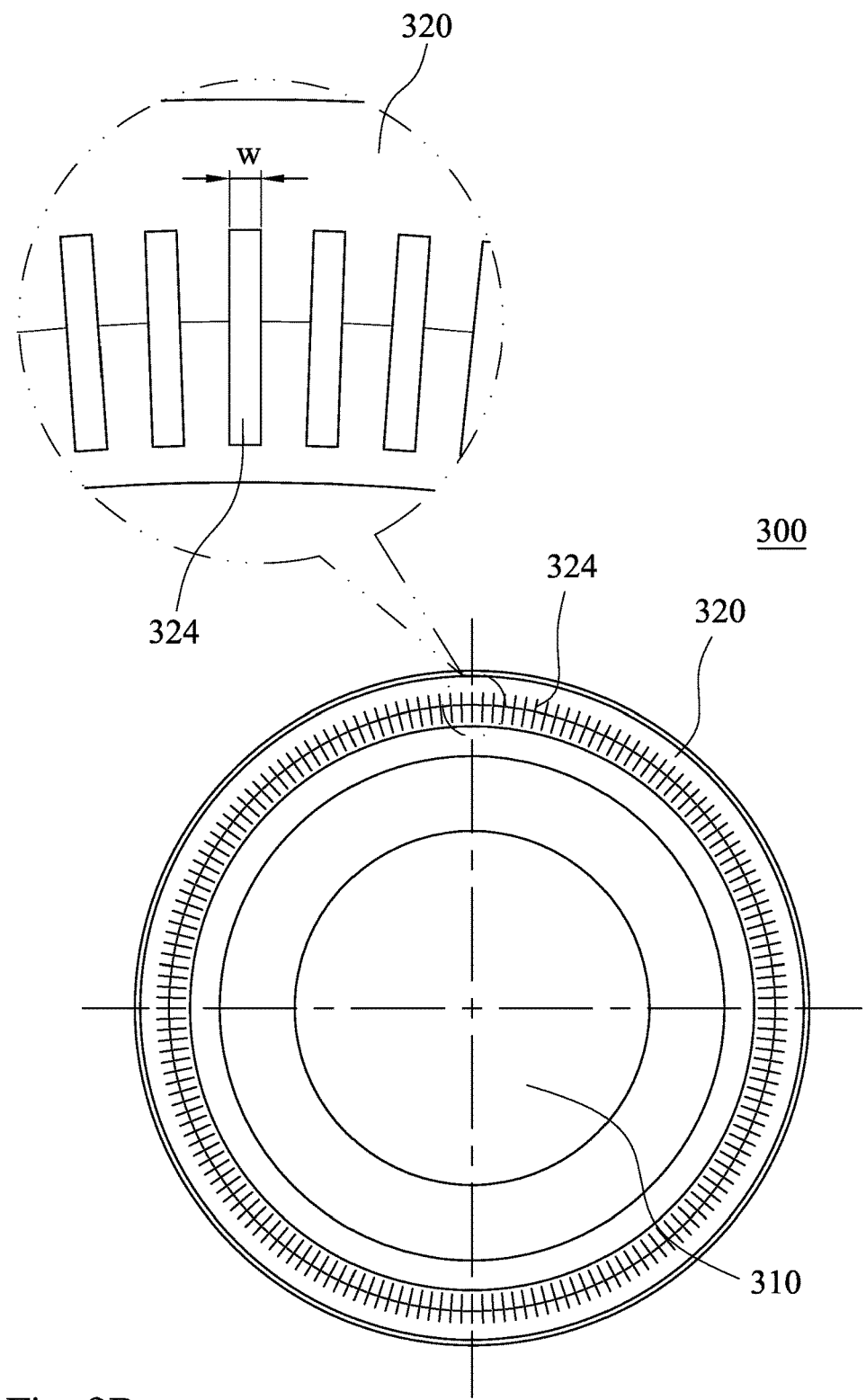
FIG. 3B shows a schematic view of the parameter w according to the 3rd embodiment.

FIG. 3A is a schematic view of a plastic lens element 300 according to the 3rd embodiment of the present disclosure, and FIG. 3B shows a schematic view of a parameter w according to the 3rd embodiment. In FIG. 3A and FIG. 3B, the plastic lens element 300 includes an effective optical portion 310 and a peripheral portion 320 in order from an optical axis to an edge of the plastic lens element 300.

The peripheral portion 320 includes a plurality of rib structures 324, wherein each of the rib structures 324 has a strip shape in a radial direction of the optical axis, and the rib structures 324 are arranged around the effective optical portion 310 and indirectly connected to the effective optical portion 310. In details, the peripheral portion 320 further includes a connection portion 323, wherein the rib structures 324 are connected to the effective optical portion 310 through the connection portion 323.

In FIG. 3B, when a width of each of the rib structures 324 in a circumferential direction of the plastic lens element 300 is w, the following condition is satisfied: w=0.03 mm.

According to the 3rd embodiment of the present disclosure, the rib structures 324 and the plastic lens element 300 are formed integrally. A number of the rib structures 324 is greater than or equal to 60, and smaller than or equal to 400.

In FIG. 3A, each of the rib structures 324 has an inclined surface 325 having an angle with the optical axis of the plastic lens element 300. The aforementioned angle is greater than 0 degrees and less than 90 degrees. In other words, the inclined surface 325 is neither parallel nor orthogonal to the optical axis of the plastic lens element 300.

In FIG. 3A, the effective optical portion 310 includes an object-side surface 311 and an image-side surface 312, wherein the object-side surface 311 is a surface of the effective optical portion 310 facing an object (not shown), the image-side surface 312 is the other surface of the effective optical portion 310 facing an image surface (not shown), and both of two surfaces (the object-side surface 311 and the image-side surface 312) of the effective optical portion 310 have a wavy shape.

In FIG. 3A, the peripheral portion 320 further includes an object-side abutting surface 321, which is disposed on a surface of the peripheral portion 320 facing the object and orthogonal to the optical axis of the plastic lens element 300. The rib structures 324 of the plastic lens element 300 is disposed on the surface of the peripheral portion 320 facing the object, and the rib structures 324 is farther from the effective optical portion 310 than the object-side abutting surface 321.

In FIG. 3A, the peripheral portion 320 further includes an image-side abutting surface 322, which is disposed on another surface of the peripheral portion 320 facing the image surface and orthogonal to the optical axis of the plastic lens element 300.

4th Embodiment

Figure 4A:
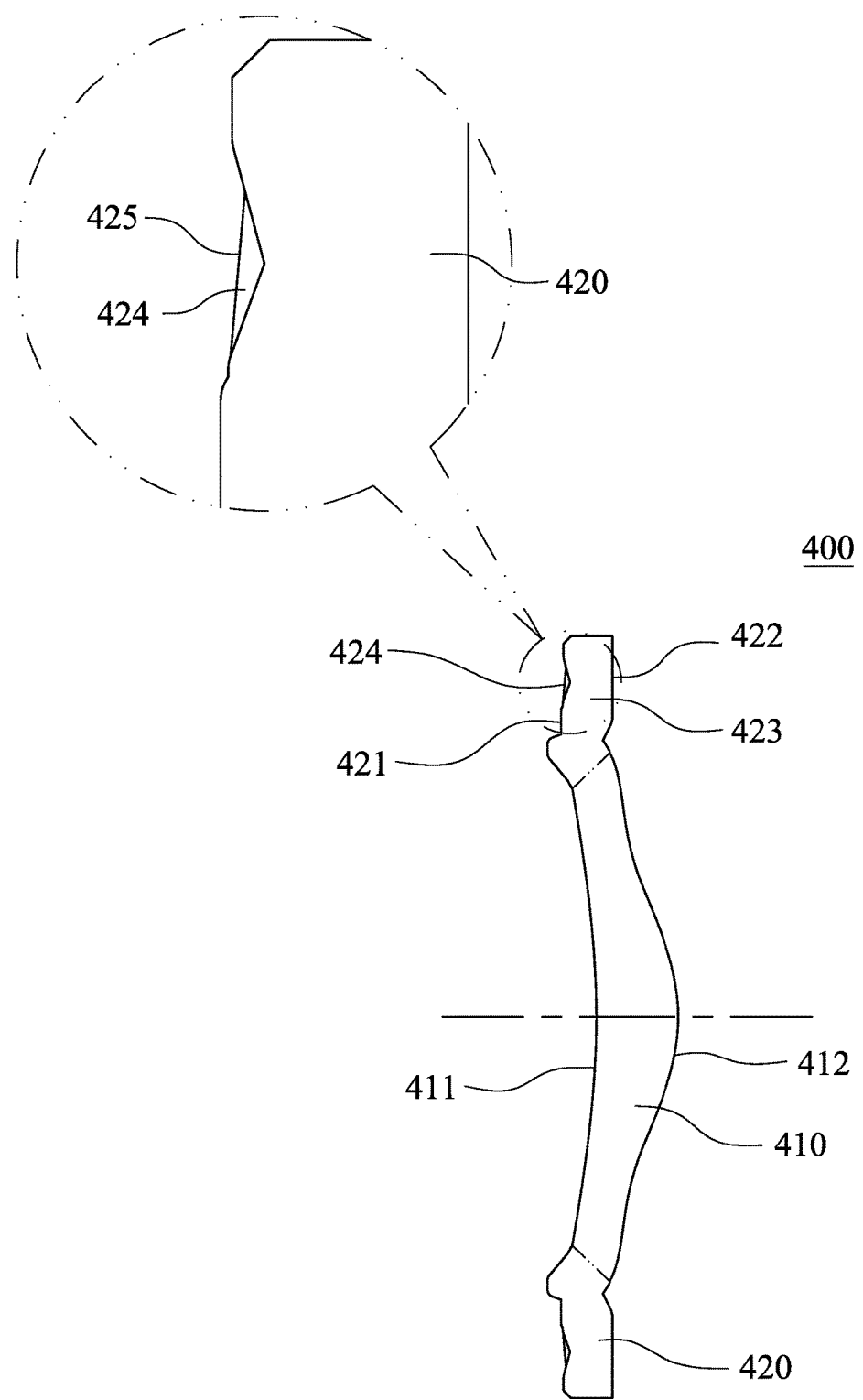
FIG. 4A is a schematic view of a plastic lens element according to the 4th embodiment of the present disclosure.
Figure 4B:
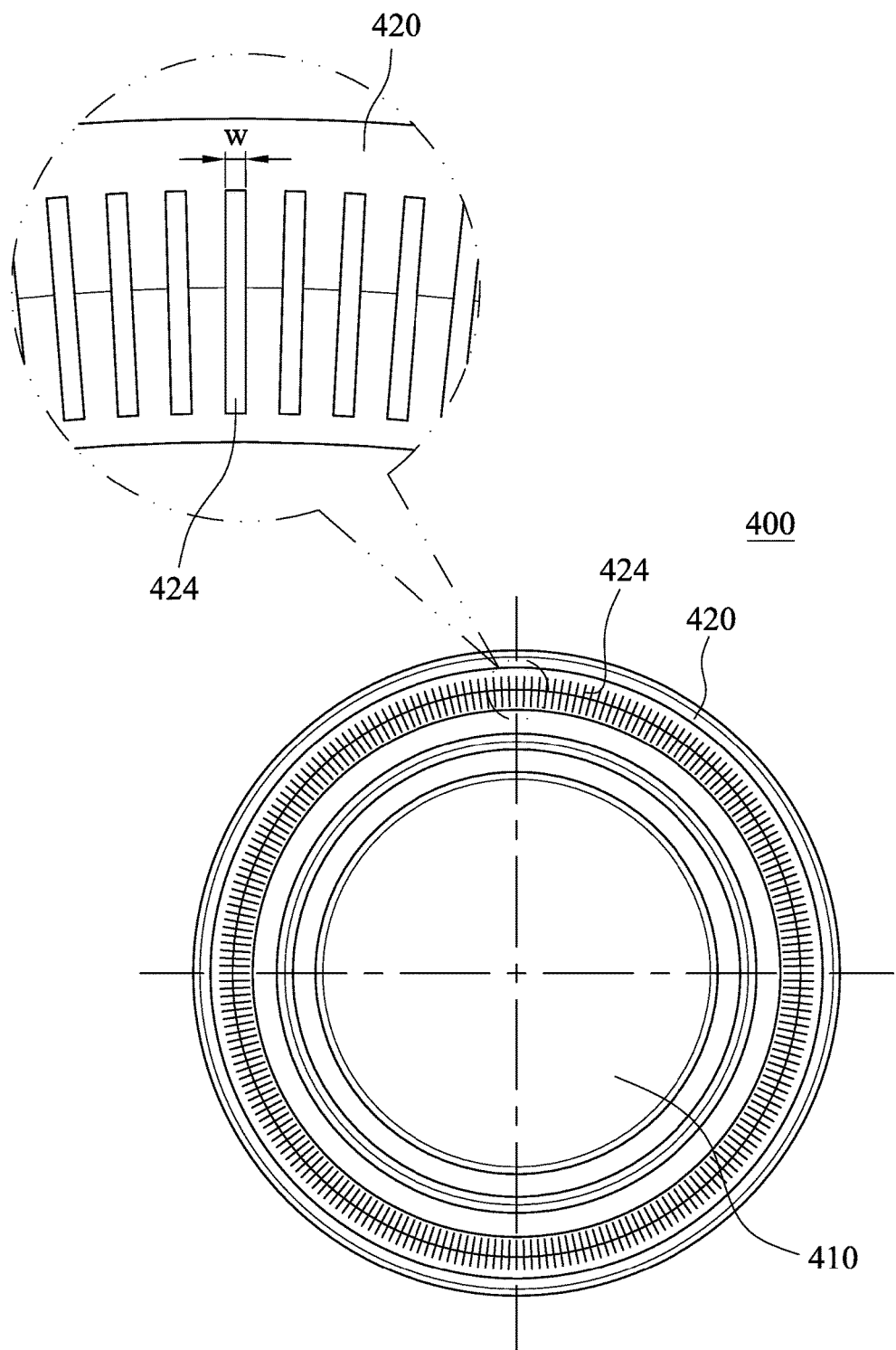
FIG. 4B shows a schematic view of the parameter w according to the 4th embodiment.

FIG. 4A is a schematic view of a plastic lens element 400 according to the 4th embodiment of the present disclosure, and FIG. 4B shows a schematic view of a parameter w according to the 4th embodiment. In FIG. 4A and FIG. 4B, the plastic lens element 400 includes an effective optical portion 410 and a peripheral portion 420 in order from an optical axis to an edge of the plastic lens element 400.

The peripheral portion 420 includes a plurality of rib structures 424, wherein each of the rib structures 424 has a strip shape in a radial direction of the optical axis, and the rib structures 424 are arranged around the effective optical portion 410 and indirectly connected to the effective optical portion 410. In details, the peripheral portion 420 further includes a connection portion 423, wherein the rib structures 424 are connected to the effective optical portion 410 through the connection portion 423.

In FIG. 4B, when a width of each of the rib structures 424 in a circumferential direction of the plastic lens element 400 is w, the following condition is satisfied: w=0.02 mm.

According to the 4th embodiment of the present disclosure, the rib structures 424 and the plastic lens element 400 are formed integrally. A number of the rib structures 424 is greater than or equal to 60, and smaller than or equal to 400.

In FIG. 4A, each of the rib structures 424 has an inclined surface 425 having an angle with the optical axis of the plastic lens element 400. The aforementioned angle is greater than 0 degrees and less than 90 degrees. In other words, the inclined surface 425 is neither parallel nor orthogonal to the optical axis of the plastic lens element 400.

In FIG. 4A, the effective optical portion 410 includes an object-side surface 411 and an image-side surface 412, wherein the object-side surface 411 is a surface of the effective optical portion 410 facing an object (not shown), the image-side surface 412 is the other surface of the effective optical portion 410 facing an image surface (not shown), and the image-side surface 412 of the effective optical portion 410 has a wavy shape.

In FIG. 4A, the peripheral portion 420 further includes an object-side abutting surface 421, which is disposed on a surface of the peripheral portion 420 facing the object and orthogonal to the optical axis of the plastic lens element 400. The rib structures 424 of the plastic lens element 400 is disposed on the surface of the peripheral portion 420 facing the object, and the rib structures 424 is farther from the effective optical portion 410 than the object-side abutting surface 421.

In FIG. 4A, the peripheral portion 420 further includes an image-side abutting surface 422, which is disposed on another surface of the peripheral portion 420 facing the image surface and orthogonal to the optical axis of the plastic lens element 400, wherein the image-side abutting surface 422 is farther from the effective optical portion 410 than the object-side abutting surface 421.

5th Embodiment

Figure 5A:
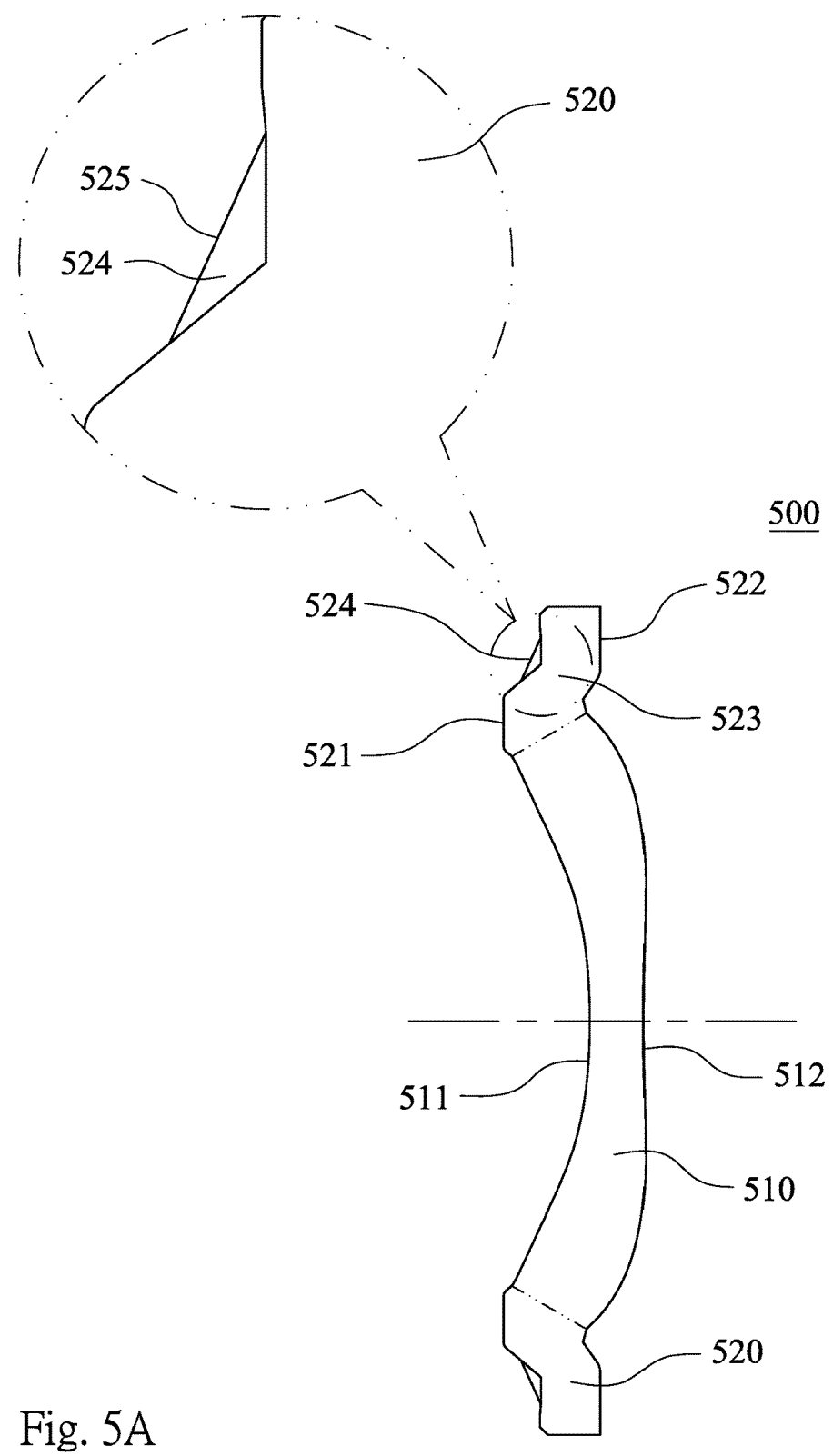
FIG. 5A is a schematic view of a plastic lens element according to the 5th embodiment of the present disclosure.
Figure 5B:
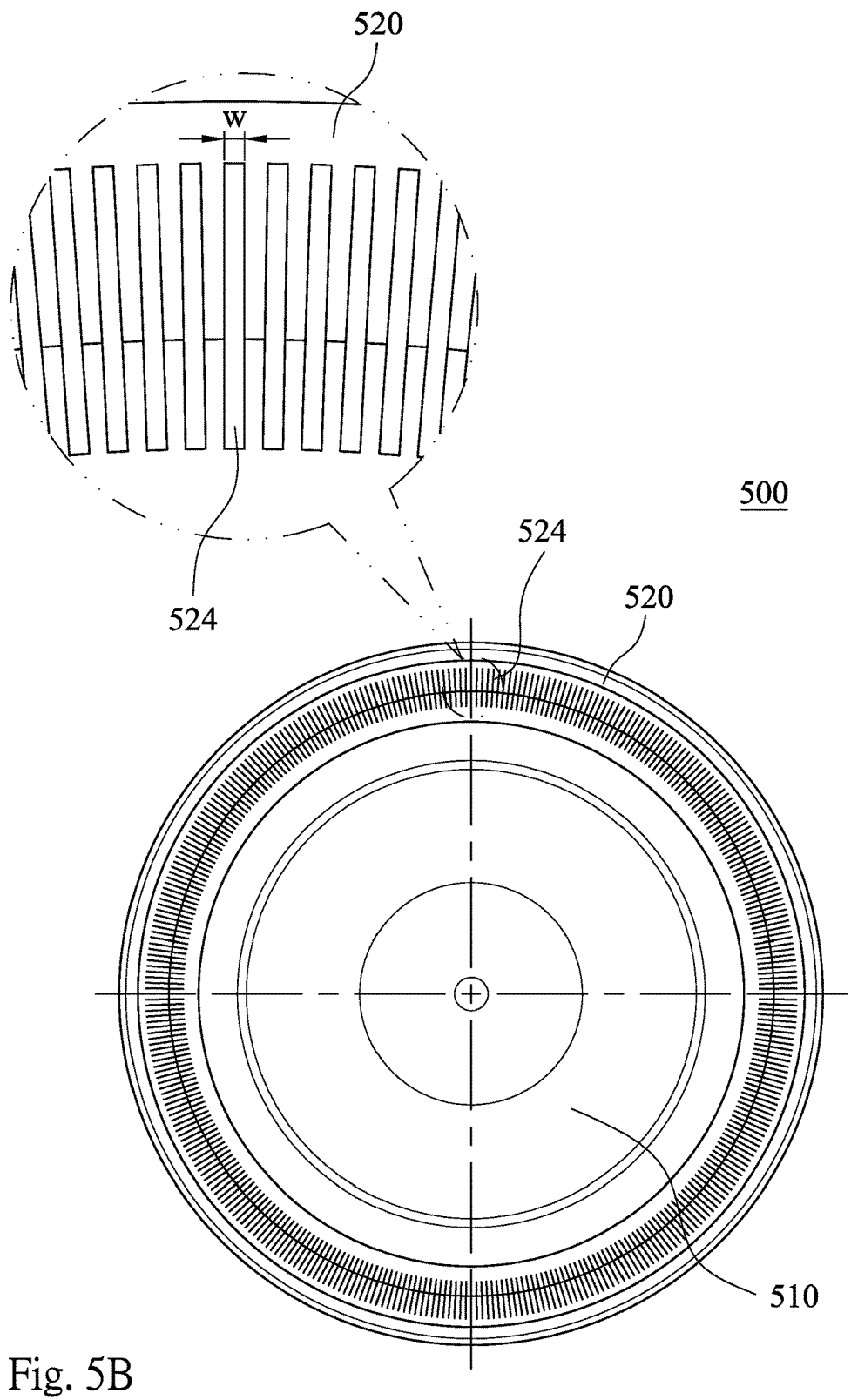
FIG. 5B shows a schematic view of the parameter w according to the 5th embodiment.

FIG. 5A is a schematic view of a plastic lens element 500 according to the 5th embodiment of the present disclosure, and FIG. 5B shows a schematic view of a parameter w according to the 5th embodiment. In FIG. 5A and FIG. 5B, the plastic lens element 500 includes an effective optical portion 510 and a peripheral portion 520 in order from an optical axis to an edge of the plastic lens element 500.

The peripheral portion 520 includes a plurality of rib structures 524, wherein each of the rib structures 524 has a strip shape in a radial direction of the optical axis, and the rib structures 524 are arranged around the effective optical portion 510 and indirectly connected to the effective optical portion 510. In details, the peripheral portion 520 further includes a connection portion 523, wherein the rib structures 524 are connected to the effective optical portion 510 through the connection portion 523.

In FIG. 5B, when a width of each of the rib structures 524 in a circumferential direction of the plastic lens element 500 is w, the following condition is satisfied: w=0.02 mm.

According to the 5th embodiment of the present disclosure, the rib structures 524 and the plastic lens element 500 are formed integrally. A number of the rib structures 524 is greater than or equal to 60, and smaller than or equal to 400.

In FIG. 5A, each of the rib structures 524 has an inclined surface 525 having an angle with the optical axis of the plastic lens element 500. The aforementioned angle is greater than 0 degrees and less than 90 degrees. In other words, the inclined surface 525 is neither parallel nor orthogonal to the optical axis of the plastic lens element 500.

In FIG. 5A, the effective optical portion 510 includes an object-side surface 511 and an image-side surface 512, wherein the object-side surface 511 is a surface of the effective optical portion 510 facing an object (not shown), the image-side surface 512 is the other surface of the effective optical portion 510 facing an image surface (not shown), and the image-side surface 512 of the effective optical portion 510 has a wavy shape.

In FIG. 5A, the peripheral portion 520 further includes an object-side abutting surface 521, which is disposed on a surface of the peripheral portion 520 facing the object and orthogonal to the optical axis of the plastic lens element 500. The rib structures 524 of the plastic lens element 500 is disposed on the surface of the peripheral portion 520 facing the object, and the rib structures 524 is farther from the effective optical portion 510 than the object-side abutting surface 521.

In FIG. 5A, the peripheral portion 520 further includes an image-side abutting surface 522, which is disposed on another surface of the peripheral portion 520 facing the image surface and orthogonal to the optical axis of the plastic lens element 500, wherein the image-side abutting surface 522 is farther from the effective optical portion 510 than the object-side abutting surface 521.

6th Embodiment

Figure 6A:
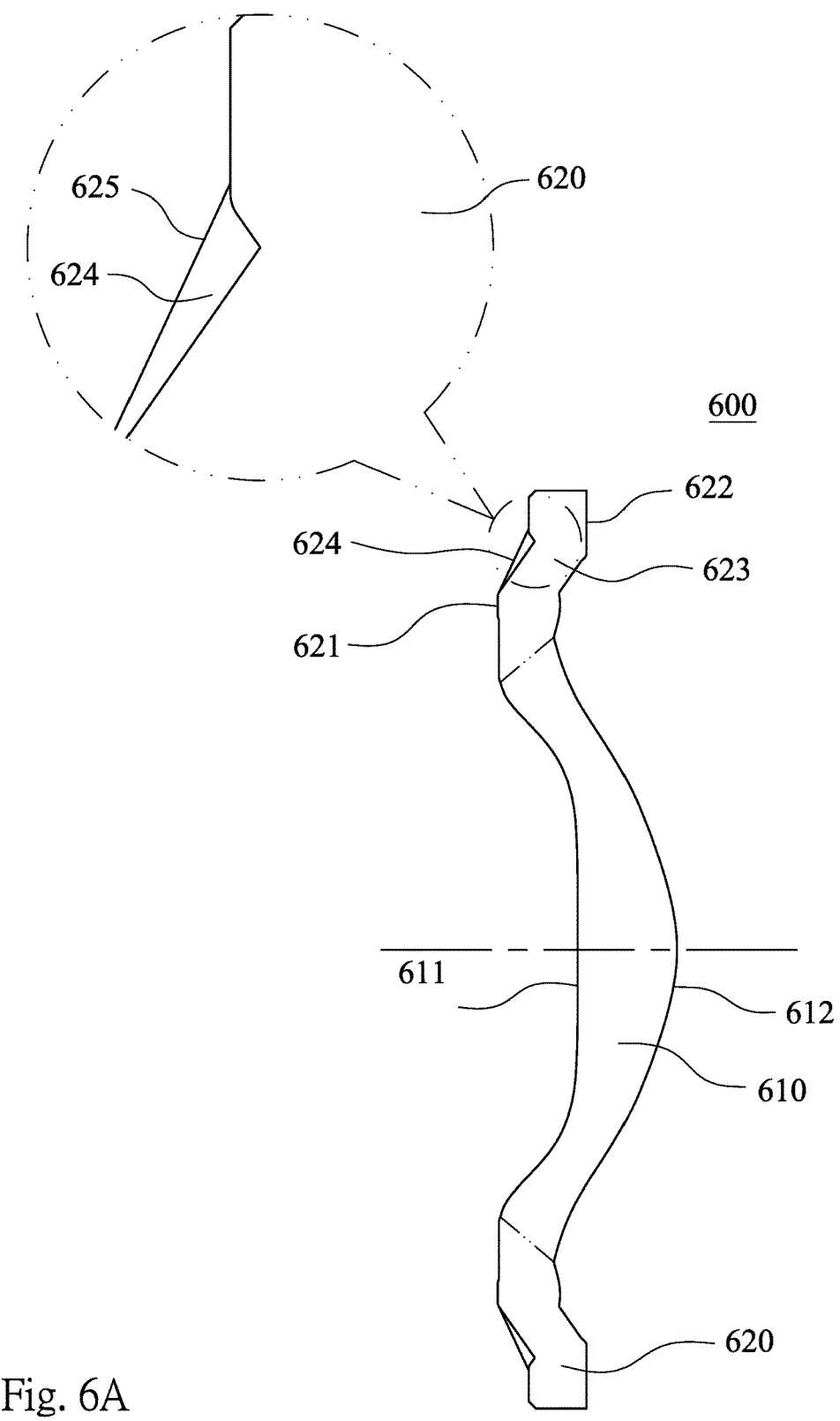
FIG. 6A is a schematic view of a plastic lens element according to the 6th embodiment of the present disclosure.
Figure 6B:
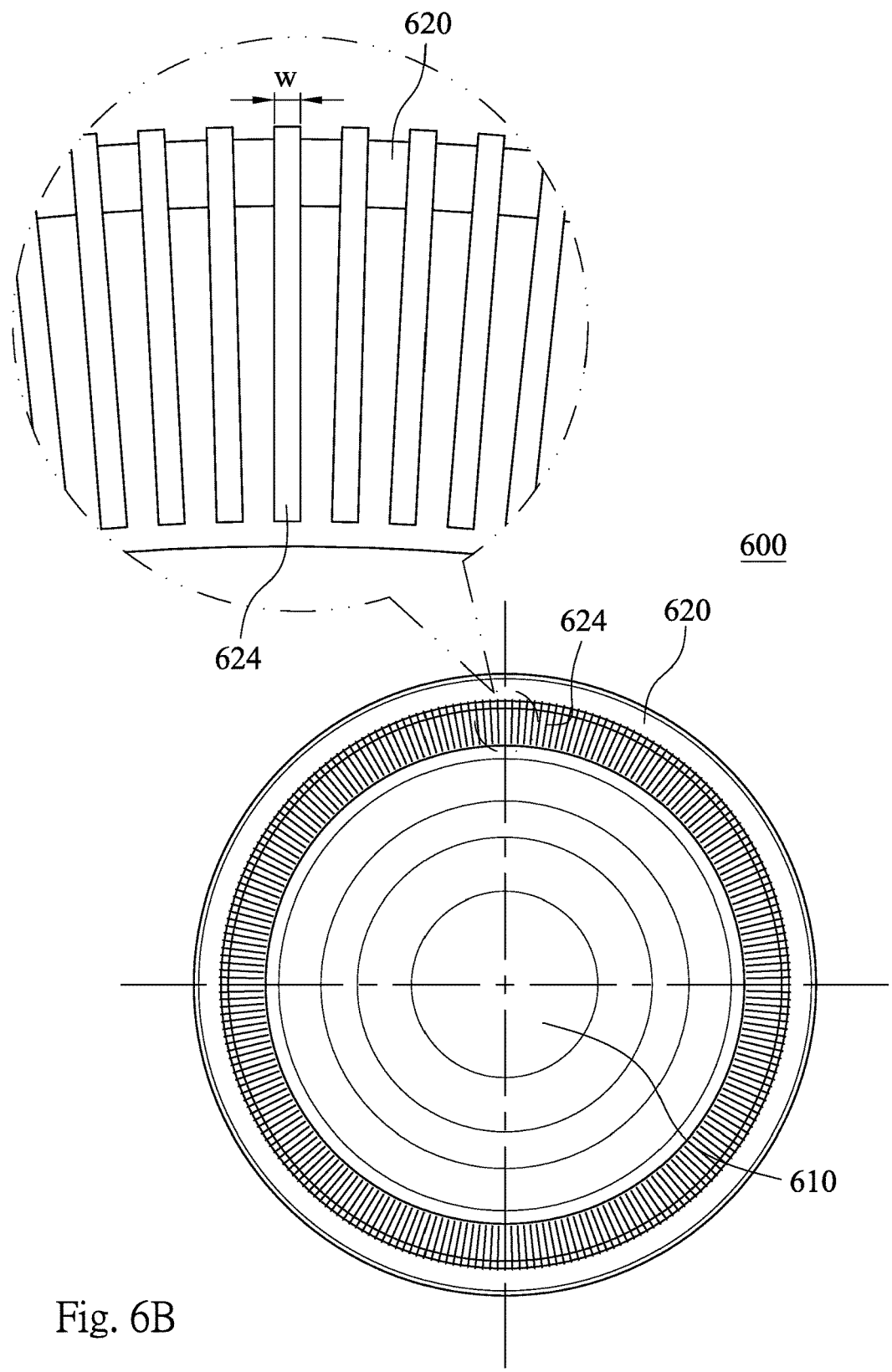
FIG. 6B shows a schematic view of the parameter w according to the 6th embodiment.

FIG. 6A is a schematic view of a plastic lens element 600 according to the 6th embodiment of the present disclosure, and FIG. 6B shows a schematic view of a parameter w according to the 5th embodiment. In FIG. 6A and FIG. 6B, the plastic lens element 600 includes an effective optical portion 610 and a peripheral portion 620 in order from an optical axis to an edge of the plastic lens element 600.

The peripheral portion 620 includes a plurality of rib structures 624, wherein each of the rib structures 624 has a strip shape in a radial direction of the optical axis, and the rib structures 624 are arranged around the effective optical portion 610 and indirectly connected to the effective optical portion 610. In details, the peripheral portion 620 further includes a connection portion 623, wherein the rib structures 624 are connected to the effective optical portion 610 through the connection portion 623.

In FIG. 6B, when a width of each of the rib structures 624 in a circumferential direction of the plastic lens element 600 is w, the following condition is satisfied: w=0.03 mm.

According to the 6th embodiment of the present disclosure, the rib structures 624 and the plastic lens element 600 are formed integrally. A number of the rib structures 624 is greater than or equal to 60, and smaller than or equal to 400.

In FIG. 6A, each of the rib structures 624 has an inclined surface 625 having an angle with the optical axis of the plastic lens element 600. The aforementioned angle is greater than 0 degrees and less than 90 degrees. In other words, the inclined surface 625 is neither parallel nor orthogonal to the optical axis of the plastic lens element 600.

In FIG. 6A, the effective optical portion 610 includes an object-side surface 611 and an image-side surface 612, wherein the object-side surface 611 is a surface of the effective optical portion 610 facing an object (not shown), the image-side surface 612 is the other surface of the effective optical portion 610 facing an image surface (not shown), and the image-side surface 612 of the effective optical portion 610 has a wavy shape.

In FIG. 6A, the peripheral portion 620 further includes an object-side abutting surface 621, which is disposed on a surface of the peripheral portion 620 facing the object and orthogonal to the optical axis of the plastic lens element 600. The rib structures 624 of the plastic lens element 600 is disposed on the surface of the peripheral portion 620 facing the object, and the rib structures 624 is farther from the effective optical portion 610 than the object-side abutting surface 621.

In FIG. 6A, the peripheral portion 620 further includes an image-side abutting surface 622, which is disposed on another surface of the peripheral portion 620 facing the image surface and orthogonal to the optical axis of the plastic lens element 600, wherein the image-side abutting surface 622 is farther from the effective optical portion 610 than the object-side abutting surface 621.

7th Embodiment

Figure 7:
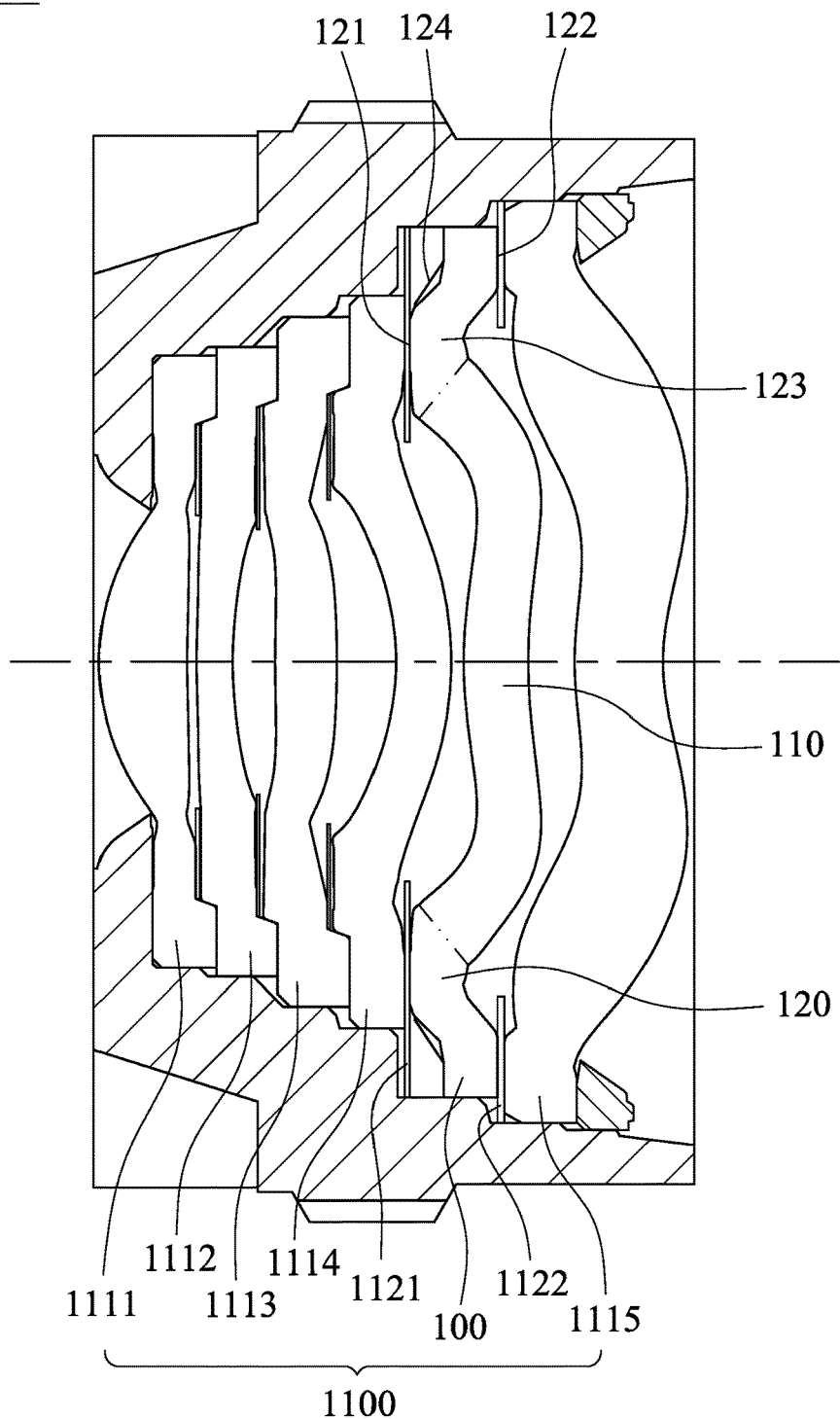
FIG. 7 shows a lens module according to the 7th embodiment of the present disclosure.

FIG. 7 shows a lens module 1000 according to the 7th embodiment of the present disclosure. In FIG. 7, the lens module 1000 includes an optical lens assembly 1100. The optical lens assembly 1100 includes the plastic lens element 100 according to the 1st embodiment of the present disclosure. Therefore, it is favorable for effectively attenuating the non-imaging light reflected from the surface of the plastic lens element 100 so as to enhance the image quality of the lens module 1000.

In FIG. 1A and FIG. 1B, the plastic lens element 100 includes the effective optical portion 110 and the peripheral portion 120 in order from the optical axis to the edge of the plastic lens element 100.

In FIG. 1A and FIG. 1B, the peripheral portion 120 includes the rib structures 124, wherein each of the rib structures 124 has the strip shape in the radial direction of the optical axis, and the rib structures 124 are arranged around the effective optical portion 110 and indirectly connected to the effective optical portion 110. In details, the peripheral portion 120 further includes the connection portion 123, wherein the rib structures 124 are connected to the effective optical portion 110 through the connection portion 123. That is, the rib structures 124 are indirectly connected to the effective optical portion 110.

In FIG. 10, when the width of each of the rib structures 124 in the circumferential direction of the plastic lens element 100 is w, the following condition can be satisfied:

0.01 mm<w<0.05 mm. In the 7th embodiment, the following condition is satisfied: w=0.02 mm. The other details of the plastic lens element 100 have been described in the foregoing paragraphs of the 1st embodiment and will not be described again herein.

In FIG. 7, the optical lens assembly 1100 can include at least five lens elements, and at least one of the lens elements is the plastic lens element 100. Therefore, it is favorable for increasing the feasibility of correcting the curved to image of the optical lens assembly 1100.

In FIG. 7, the optical lens assembly 1100 can further include at least one optical element (its reference numeral is omitted) abutted with the plastic lens element 100, wherein the rib structures 124 of the plastic lens element 100 do not have contact with the optical element, and the optical element can be a lens element, a spacer or a light blocking plate. Therefore, it is favorable for prevent the completeness of the rib structures 124 from the damages during assembling the lens module 1000.

According to the 7th embodiment of the present disclosure, the optical lens assembly 1100 includes, in order from an object side to an image side, lens elements 1111, 1112, 1113, 1114, a spacer 1121, the plastic lens element 100, a spacer 1122 and a lens element 1115, wherein the optical lens assembly 1100 has a total of six lens elements, and the spacers 1121, 1122 are the optical elements and abutted with the plastic lens element 100. In details, the spacer 1121 is disposed on the object side of the plastic lens element 100, and the spacer 1122 is disposed on the image side of the plastic lens element 100, wherein the spacers 1121, 1122 are both abutted with the plastic lens element 100, and the rib structures 124 do not have contact with the spacers 1121, 1122.

In FIG. 1A and FIG. 7, the peripheral portion 120 can further include the object-side abutting surface 121 disposed on the surface of the peripheral portion 120 facing the object, wherein the optical element of the optical lens assembly 1100 is abutted with the object-side abutting surface 121. Therefore, it is favorable for obtaining the stable optical quality of the optical lens assembly 1100 after assembling. In the 7th embodiment, the spacer 1121 of the optical lens assembly 1100 is abutted with the object-side abutting surface 121.

In FIG. 1A and FIG. 7, the rib structures 124 of the plastic lens element 100 can be disposed on the surface of the peripheral portion 120 facing the object, and the rib structures 124 can be farther from the effective optical portion 110 than the object-side abutting surface 121. Therefore, it is favorable for increasing the divergence efficiency of the reflected light of the plastic lens element 100 so as to avoid the reflected light incident on the image surface of the lens module 1000.

In FIG. 1A and FIG. 7, the peripheral portion 120 can further include the image-side abutting surface 122 disposed on the surface of the peripheral portion 120 facing the image surface, wherein the image-side abutting surface 122 can be farther from the effective optical portion 110 than the object-side abutting surface 121. Therefore, it is favorable for the lens module 1000 applicable to the imaging apparatus with high pixels. In the 7th embodiment, the spacer 1122 of the optical lens assembly 1100 is abutted with the image-side abutting surface 122, and the image-side abutting surface 122 is farther from the effective optical portion 110 than the object-side abutting surface 121.

8th Embodiment

Figure 8:
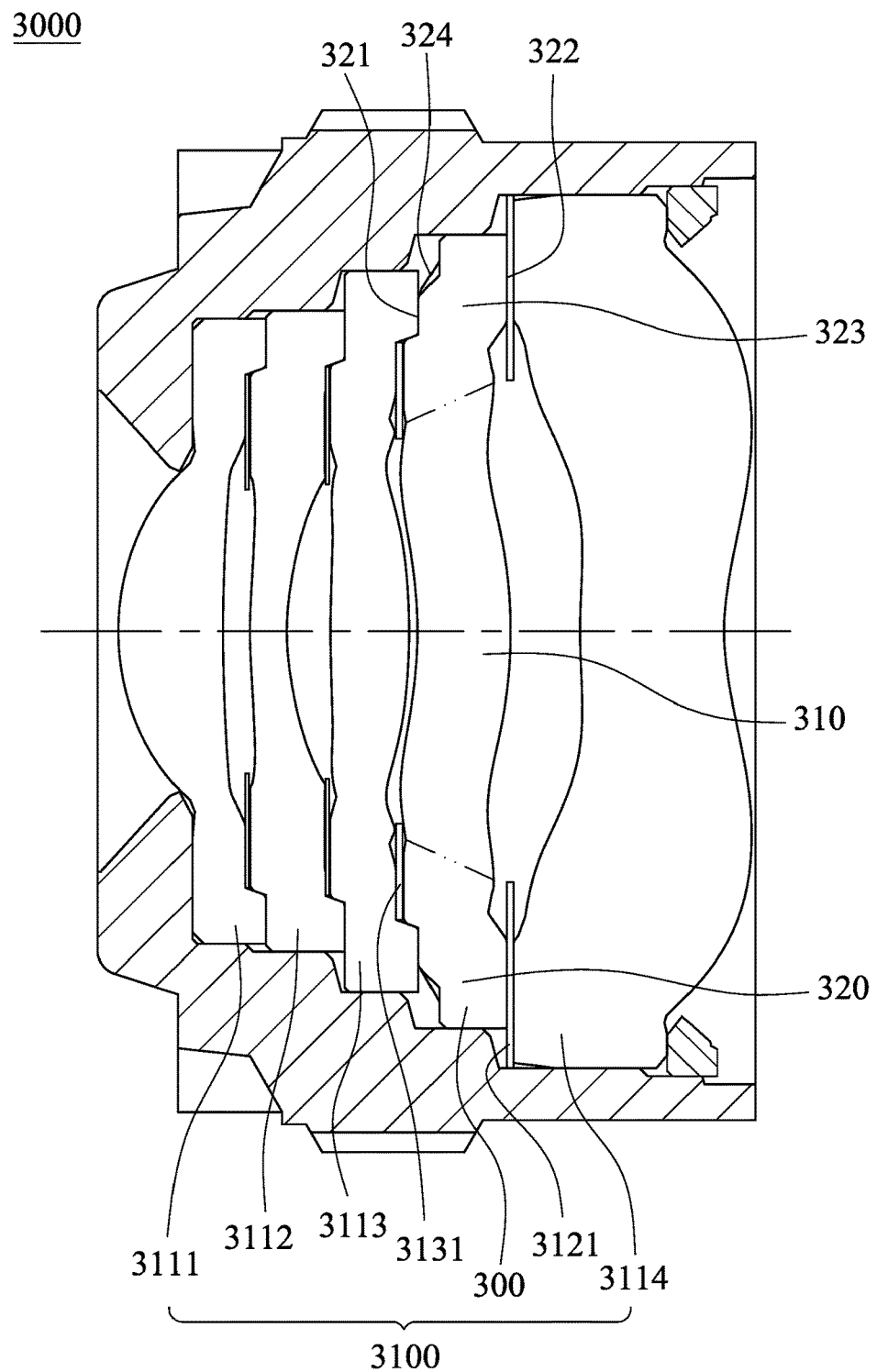
FIG. 8 shows a lens module according to the 8th embodiment of the present disclosure.

FIG. 8 shows a lens module 3000 according to the 8th embodiment of the present disclosure. In FIG. 8, the lens module 3000 includes an optical lens assembly 3100. The optical lens assembly 3100 includes the plastic lens element 300 according to the 3rd embodiment of the present disclosure.

In FIG. 3A and FIG. 3B, the plastic lens element 300 includes the effective optical portion 310 and the peripheral portion 320 in order from the optical axis the edge of the plastic lens element 300.

In FIG. 3A and FIG. 3B, the peripheral portion 320 includes the rib structures 324, wherein each of the rib structures 324 has the strip shape in the radial direction of the optical axis, and the rib structures 324 are arranged around the effective optical portion 310 and indirectly connected to the effective optical portion 310. In details, the peripheral portion 320 further includes the connection portion 323, wherein the rib structures 324 are connected to the effective optical portion 310 through the connection portion 323. That is, the rib structures 324 are indirectly connected to the effective optical portion 310.

In FIG. 3B, when the width of each of the rib structures 324 in the circumferential direction of the plastic lens element 300 is w, the following condition is satisfied: w=0.03 mm. The other details of the plastic lens element 300 have been described in the foregoing paragraphs of the 3rd embodiment and will not be described again herein.

In FIG. 8, the optical lens assembly 3100 includes, in order from an object side to an image side, lens elements 3111, 3112, 3113, a light blocking plate 3131, the plastic lens element 300, a spacer 3121 and a lens element 3114, wherein the optical lens assembly 3100 has a total of five lens elements, and the lens element 3113, the light blocking plate 3131 and the spacer 3121 are the optical elements and abutted with the plastic lens element 300. In details, the lens element 3113 and the light blocking plate 3131 are disposed on the object side of the plastic lens element 300, and the spacer 3121 is disposed on the image side of the plastic lens element 300, wherein the lens element 3113, the light blocking plate 3131 and the spacer 3121 are all abutted with the plastic lens element 300, and the rib structures 324 do not have contact with the lens element 3113, the light blocking plate 3131 and the spacer 3121.

In FIG. 3A and FIG. 8, the peripheral portion 320 further includes the object-side abutting surface 321 disposed on the surface of the peripheral portion 320 facing the object, wherein the lens element 3113 and the light blocking plate 3131 of the optical lens assembly 3100 are abutted with the object-side abutting surface 321.

In FIG. 3A and FIG. 8, the rib structures 324 of the plastic lens element 300 are disposed on the surface of the peripheral portion 320 facing the object, and the rib structures 324 are farther from the effective optical portion 310 than the object-side abutting surface 321.

In FIG. 3A and FIG. 8, the peripheral portion 320 further includes the image-side abutting surface 322 disposed on the surface of the peripheral portion 320 facing the image surface, wherein the spacer 3121 of the optical lens assembly 3100 is abutted with the image-side abutting surface 322, and the image-side abutting surface 322 is farther from the effective optical portion 310 than the object-side abutting surface 321.

9th Embodiment

Figure 9:
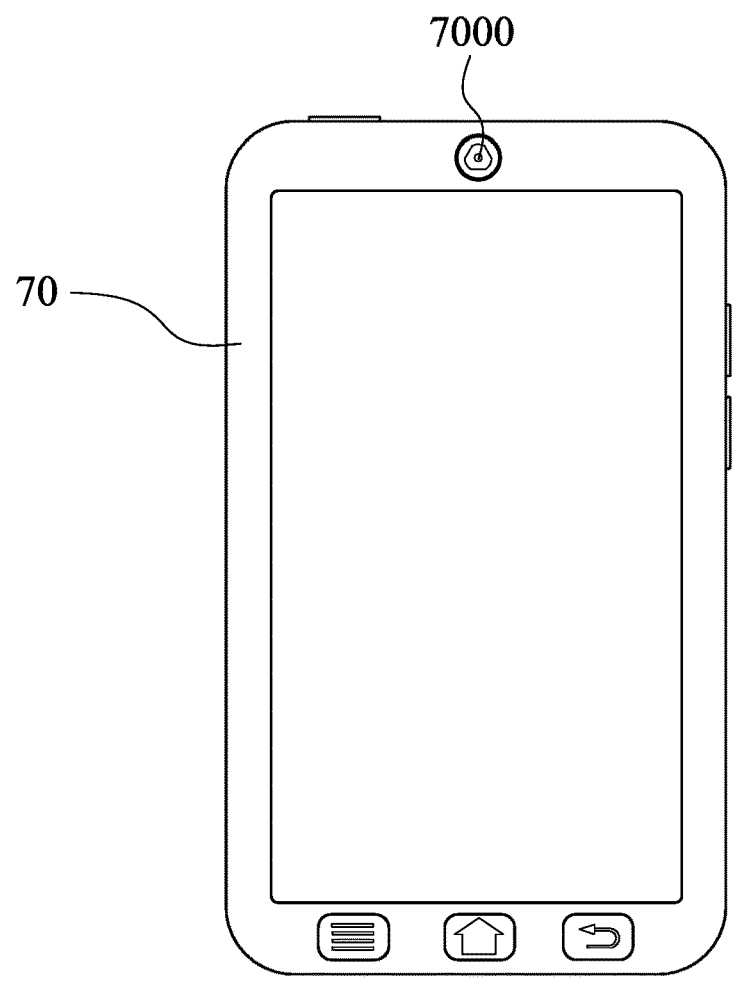
FIG. 9 shows an electronic device according to the 9th embodiment of the present disclosure.

FIG. 9 shows an electronic device 70 according to the 9th embodiment of the present disclosure. The electronic device 70 of the 9th embodiment is a smart phone, wherein the electronic device 70 includes a lens module 7000, and the lens module 7000 includes a plastic lens element (not shown) according to the present disclosure. Therefore, it is favorable for effectively attenuating the non-imaging light reflected from the surface of the plastic lens element so as to enhance the image quality and satisfy the requirements of high-end electronic devices with camera functionalities. Furthermore, the electronic device 70 can further include an image sensor disposed on or near an image surface of the lens module 7000. Preferably, the electronic device 70 can further include but not limited to a display, a control unit, a storage unit, a random access memory unit (RAM), a read-only memory unit (ROM) or a combination thereof.

10th Embodiment

FIG. 10 shows an electronic device 80 according to the 10th embodiment of the present disclosure. The electronic device 80 of the 10th embodiment is a tablet personal computer, wherein the electronic device 80 includes a lens module 8000, and the lens module 8000 includes a plastic lens element (not shown) according to the present disclosure.

11th Embodiment

Figure 11:
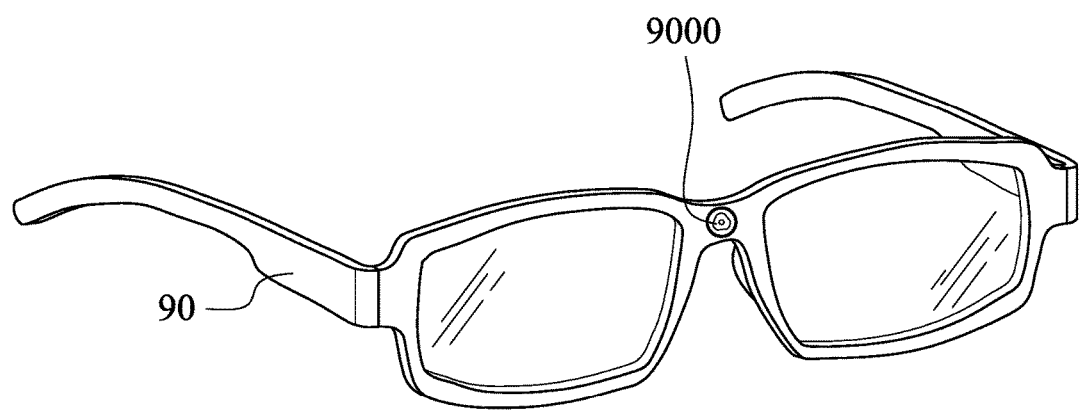
FIG. 11 shows an electronic device according to the 11th embodiment of the present disclosure.

FIG. 11 shows an electronic device 90 according to the 11th embodiment of the present disclosure. The electronic device 90 of the 11th embodiment is a wearable device, wherein the electronic device 90 includes a lens module 9000, and the lens module 9000 includes a plastic lens element (not shown) according to the present disclosure.

Although the present disclosure has been described in considerable detail with reference to the embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. A lens module, comprising an optical lens assembly, wherein the optical lens assembly comprises a plastic lens element and an optical element, and in order from an optical axis of the plastic lens element to an edge thereof, the plastic lens element comprises:
   an effective optical portion; and
   a peripheral portion, comprising:
      a plurality of strip-shaped rib structures, wherein each of the strip-shaped rib structures has a strip shape in a radial direction of the optical axis, and the strip-shaped rib structures are arranged around the effective optical portion and indirectly connected to the effective optical portion; and
      an image-side abutting surface disposed on a surface of the peripheral portion facing an image surface, wherein the optical element is abutted with the image-side abutting surface.

2. The lens module of claim 1, wherein the strip-shaped rib structures and the plastic lens element are formed integrally.

3. The lens module of claim 2, wherein a width of each of the strip-shaped rib structures in a circumferential direction of the plastic lens element is (w), and the following condition is satisfied:

$$0.01 \text{ mm} < w < 0.05 \text{ mm}.$$

4. The lens module of claim 2, wherein a number of the strip-shaped rib structures is greater than or equal to 60, and smaller than or equal to 400.

5. The lens module of claim 2, wherein at least one of two surfaces of the effective optical portion has a wavy shape.

6. The lens module of claim 2, wherein each of the strip-shaped rib structures has an inclined surface having an angle with the optical axis of the plastic lens element.

7. An electronic device, comprising:
   the lens module of claim 1.

* * * * *